US005646603A

United States Patent [19]
Nagata et al.

[11] Patent Number: 5,646,603
[45] Date of Patent: Jul. 8, 1997

[54] REMOTE CONTROL APPARATUS FOR RECORDING/PLAYBACK EQUIPMENT

[75] Inventors: Atsushi Nagata; Haruo Iwasaki; Kazuhiko Shimizu, all of Kanagawa; Yoshinori Tanba, Tokyo; Takafumi Abe, Kanagawa; Tatsuo Imai, Kanagawa; Akihiro Kikuchi, Kanagawa; Teruyuki Miyakawa, Kanagawa, all of Japan

[73] Assignee: Sony Corporation, Tokyo, Japan

[21] Appl. No.: 565,274

[22] Filed: Nov. 30, 1995

Related U.S. Application Data

[63] Continuation of Ser. No. 219,919, Mar. 30, 1994, abandoned.

[30] Foreign Application Priority Data

Apr. 2, 1993 [JP] Japan .................. 5-077256

[51] Int. Cl.⁶ .................................................. H04Q 1/00
[52] U.S. Cl. .................. 340/825.25; 340/825.22; 348/474; 386/65; 386/83
[58] Field of Search .................. 340/825.22, 825.24, 340/825.25, 825.69, 825.72; 369/50; 360/14.1, 72.1; 348/10, 474, 552; 455/3.1; 386/65, 83

[56] References Cited

U.S. PATENT DOCUMENTS

| | | | |
|---|---|---|---|
| 4,308,563 | 12/1981 | Gohda | 360/72.1 |
| 4,706,121 | 11/1987 | Young | 340/825.22 |
| 4,746,919 | 5/1988 | Reitmeier | 340/825.69 |
| 5,257,254 | 10/1993 | Kutaragi | 369/50 |
| 5,307,173 | 4/1994 | Yuen | 358/335 |
| 5,335,079 | 8/1994 | Yuen | 386/65 |
| 5,488,409 | 1/1996 | Yuen | 386/65 |

*Primary Examiner*—Brian Zimmerman
*Attorney, Agent, or Firm*—William S. Frommer; Alvin Sinderbrand

[57] ABSTRACT

A remote control apparatus for recording/playback equipment capable of remotely controlling complicated recording playback equipment while placing little burden on the control side. Schedule data is transmitted from an uplink system 100 to a downlink system 200 via a communications satellite. The schedule data includes operation data for recording and playback operations and their related operations, start data which displays at least the operation start time, and position data which indicates the recording/playback position on the recording medium. The received schedule data is stored in a non-volatile RAM in the control area of the VCR 203. The VCR then uses this schedule data as a basis for automatically carrying out recording or playback operations and their related operations. As is no longer necessary to control the operation by providing appropriate commands to the VCR 203 in real time, the burden on the control side is greatly eased with regards to the control of complicated operations in addition to recording and playback, such as rewind and pre-roll operation modes.

9 Claims, 15 Drawing Sheets

Structure of Audio Signal

Fig. 4

Schedule Command (VTR picture recording operation control)

| byte | function | No. of bytes | value |
|---|---|---|---|
| 0, 1 | function code | 2 | 0102.H |
| 2~8 | start date, time, year | 7 | month, day, hours, minues, seconds |
| 9 | (reserve) | 1 | 00H |
| 10~13 | recording start position | 4 | hours, minutes, seconds, frame |
| 14~17 | recording end position | 4 | hours, minutes, seconds, frame |
| 18~21 | group | 4 | 0~29 group<br>30 : reserve<br>31 : all groups |
| 22, 23 | mode | 2 | 01H : REC<br>02H : LIVE<br>03H : REC/LIVE<br>81H : REC &<br>    recording check<br>83H : REC/LIVE<br>    & recording check |
| 24, 25 | media | 2 | bit    media<br>0    VTR1<br>1    VTR2<br>2    VTR3<br>3    VTR4 |
| 26 | execution number | 1 | 1~255,<br>0 : not executed |
| 27 | (reserve) | 1 | 00H |
| 28~31 | repeat interval | 4 | day, hours, minutes, seconds |
| 32 | check sum | 1 | |
| 33 | (reserve) | 1 | 00H |

Fig.5

Picture Recording Operation Mode

| code | title | function |
|------|-------|----------|
| 0 1 H | R E C | picture recording only |
| 0 2 H | L I V E | picture not recorded, mute control, TV control |
| 0 3 H | R E C / L I V E | picture recorded, mute control, TV control |
| 8 1 H | R E C & record check | recording check carried out at the end of picture recording |
| 8 3 H | R E C / L I V E & record check | Recording, mute, TV control carried out, recording check carried out at end |

Fig.6

Schedule Command (VTR playback operation control)

| byte | function | No. of bytes | value |
|---|---|---|---|
| 0, 1 | function code | 2 | 0 1 0 3 H |
| 2~8 | start date, time, year | 7 | year, month, day, hours, minues, seconds |
| 9 | (reserve) | 1 | 0 0 H |
| 10~13 | playback start position | 4 | hours, minutes, seconds, frame |
| 14~17 | playback end position | 4 | hours, minutes, seconds, frame |
| 18~21 | group | 4 | 0~29 group<br>30 : reserve<br>31 : all groups |
| 22, 23 | mode | 2 | 01H : NORMAL<br>02H : POWER ON<br>03H : AUTO |
| 24, 25 | media | 2 | bit    media<br>0    VTR1<br>1    VTR2<br>2    VTR3<br>3    VTR4 |
| 26 | execution number | 1 | 1~255,<br>0 : not executed |
| 27 | (reserve) | 1 | 0 0 H |
| 28~31 | repeat interval | 4 | day, hours, minues, seconds |
| 32 | check sum | 1 | |
| 33 | (reserve) | 1 | 0 0 H |

Playback Operation Mode

| code | title | function |
|---|---|---|
| 0 1 H | NORMAL | playback only |
| 0 2 H | POWER | playback, mute control, TV control |
| 0 3 H | AUTO | playback, mute control, TV control |

Schemitical Structure of VTR

Receiving Schedule Commands

Schedule Execution

Flow of playback operation

Tape segmentation

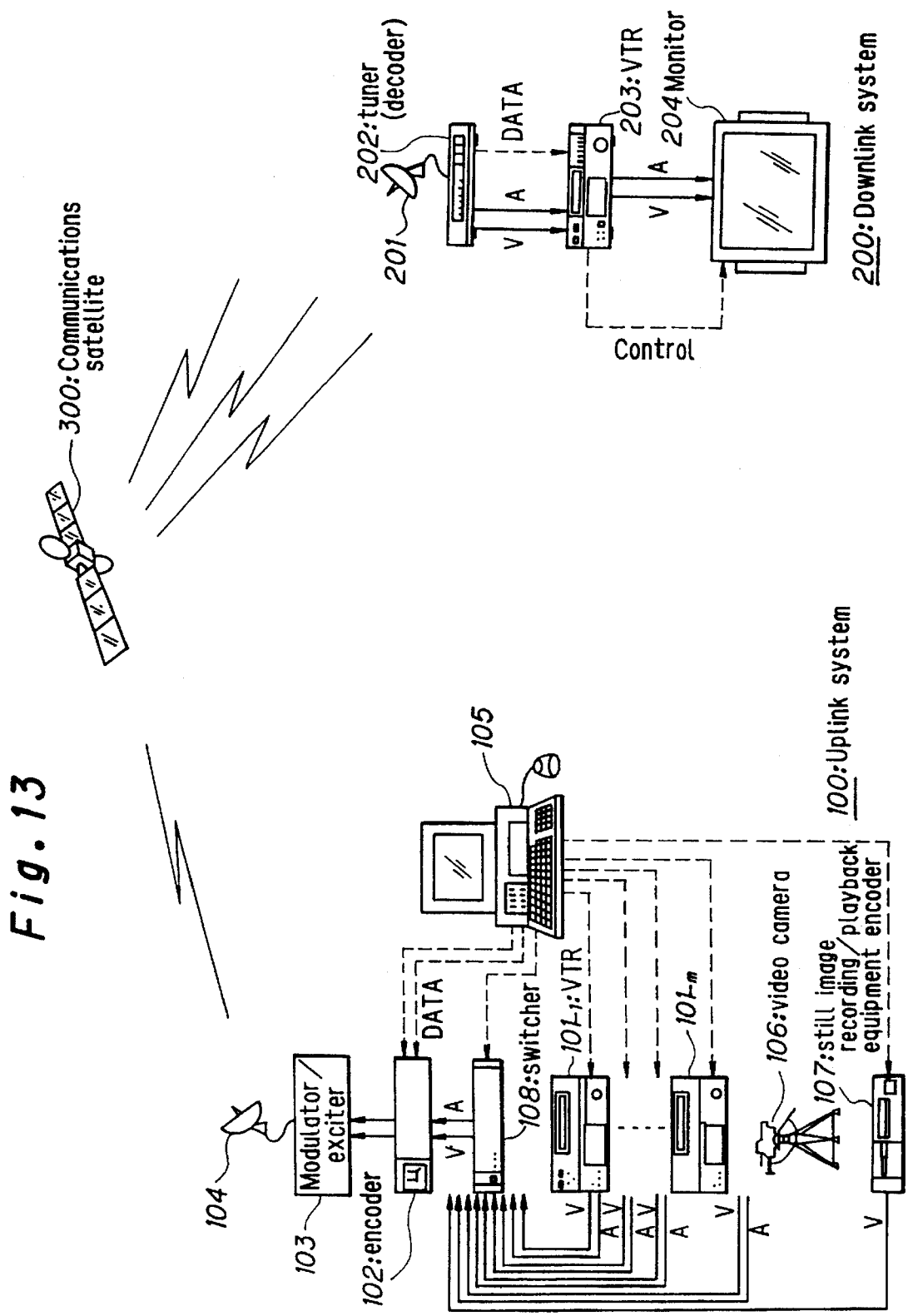

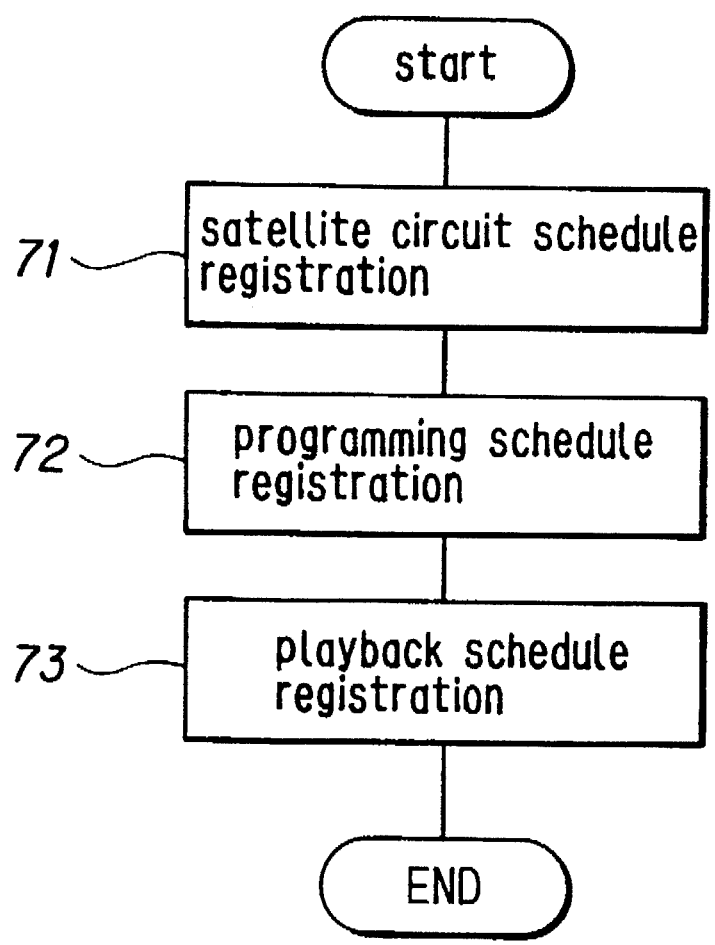

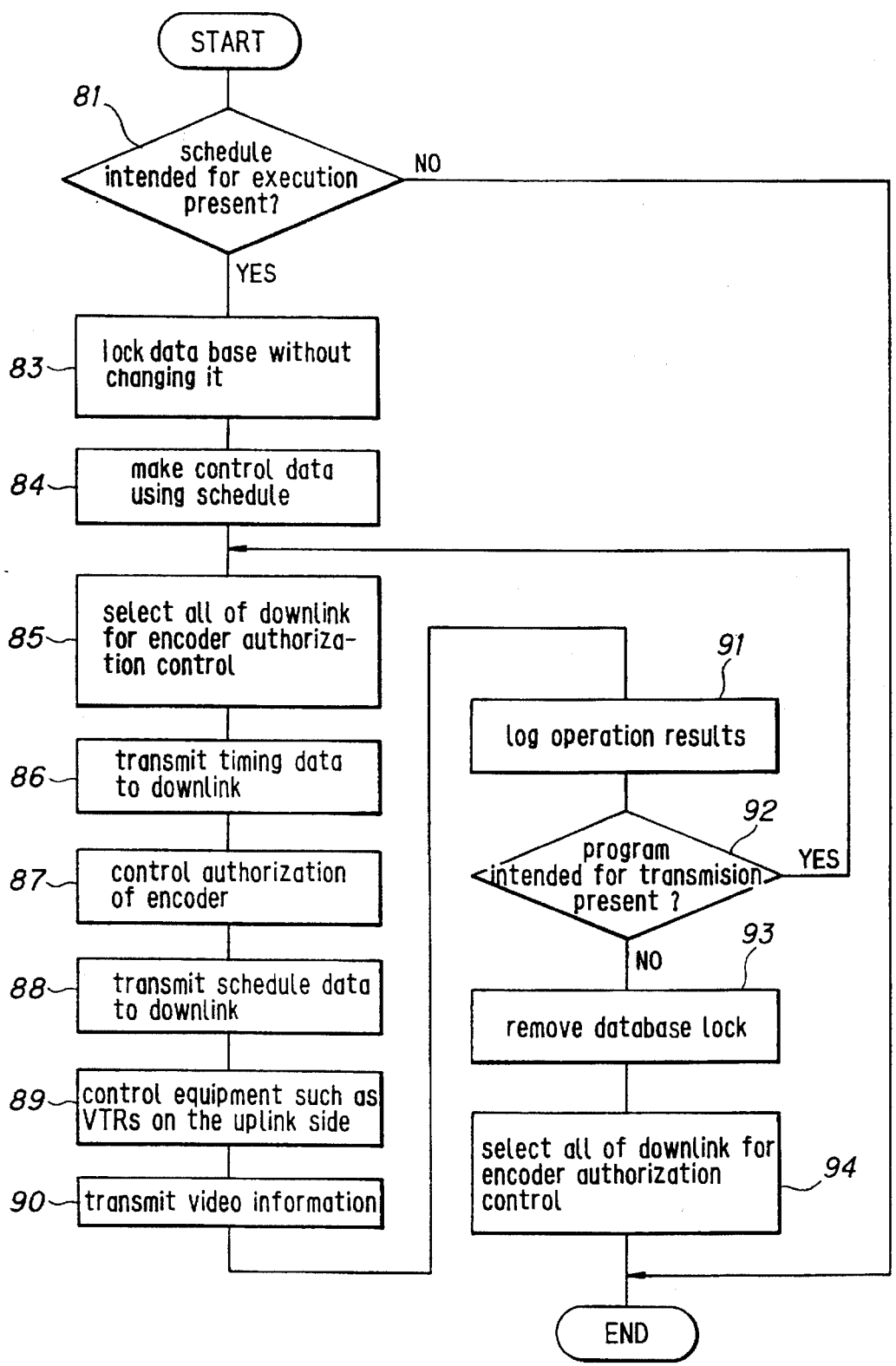
Fig. 15  Operation of Uplink Side

Fig.16

Schedule Command (setting timing)

| byte | function | No. of bytes | value |
|---|---|---|---|
| 0,1 | function code | 2 | 0 1 0 1 H |
| 2,3 | start day, time, year | 2 | 1 9 9 2 ~ |
| 4 | month | 1 | 1 ~ 1 2 |
| 5 | day | 1 | 1 ~ 3 1 |
| 6 | hour | 1 | 0 ~ 2 3 |
| 7 | minute | 1 | 0 ~ 5 9 |
| 8 | second | 1 | 0 ~ 5 9 |
| 9 | (reserve) | 1 | 0 0 H |
| 10~13 | recording start position | 4 | Don't care |
| 14~17 | recording end position | 4 | Don't care |
| 18~21 | group | 4 | 0~29 : group<br>30 : reserve<br>31 : all groups |
| 22,23 | mode | 2 | undecided |
| 24,25 | media | 2 | Don't care |
| 26 | execution number | 2 | Don't care |
| 27 | (reserve) | 1 | 0 0 H |
| 28~31 | repeat interval | 4 | Don't care |
| 32 | check sum | 1 | |
| 33 | (reserve) | 1 | 0 0 H |

REMOTE CONTROL APPARATUS FOR RECORDING/PLAYBACK EQUIPMENT

This application is a continuation of application Ser. No. 08/219,919, filed Mar. 30, 1994 now abandoned.

BACKGROUND OF THE INVENTION

1. Field of the Invention

The present invention relates to a remote control apparatus for recording/playback equipment, for remotely controlling for example, a VCR via a communications satellite.

2. Description of the Related Art

In the prior art, with the remote control of recording/playback equipment such as VCRs, when, for example, pre-rolling is carried out from when the head comes out, the mute is turned off after a predetermined time and the playback picture is viewed on the monitor, the condition of the VCR is usually observed on the control side and it is necessary to send appropriate commands to the recording/playback equipment in real time.

However, the remote control interface will either be a parallel communication or a high speed serial communication type interface. The real time sending of appropriate commands to the recording/playback equipment therefore places a heavy burden on the control side, which makes remote control difficult.

SUMMARY OF THE INVENTION

It is therefore the object of this invention to provide a remote control apparatus for recording/playback equipment capable of remotely controlling recording/playback equipment which operates in a complicated manner, whilst putting little burden on the control side.

Therefore, in the present invention, a remote control apparatus for recording/playback equipment comprises data outputting means for outputting control data for controlling the operating mode of a plurality of recording/playback equipment on the signal receiving side, data transmitting means for transmitting control data outputted from the data outputting means, data receiving means for receiving control data transmitted by the data transmitting means, storage means for storing control data received by the data receiving means, recording/playback equipment and control means for controlling the operation of the recording/playback equipment in accordance with control data stored in the storage means.

Also, in the present invention, a remote control apparatus for recording/playback apparatus comprises data outputting means for outputting first control data for controlling the operating modes of a plurality of recording/playback equipment on the signal receiving side and second control data for controlling the operation of audio or visual equipment on the signal transmission side, transmitting means for transmitting the first control data outputted by the data outputting means and transmitting an image signal or audio signal being outputted by the audio and/or visual equipment under the control of the second control data, receiving means for receiving the first control data transmitted by the transmitting means and an image signal and/or audio signal, storage means for storing the first control data received by the receiving means, recording/playback equipment for providing the image signal and/or audio signal received at the receiving means and control means for controlling the operation of the recording/playback equipment in accordance with the first control data stored in the storage means.

On the signal receiving side, control data for the recording/playback equipment which has been transmitted beforehand is stored in the storage means. The operation of the recording/playback equipment is then controlled in accordance with this control data. It is therefore no longer necessary to provide appropriate commands to the recording/playback equipment in real time in order to control it's operation. This means that it is possible to ease the load on the control side with regards to complicated control such as the control of a number of operating modes for the recording/playback equipment.

Also, by acquiring first control data for controlling recording/playback equipment on the signal receiving side using the data output means and obtaining second control data for controlling the operation of visual and/or sound equipment on the signal transmitting side, it is possible to operate the visual and/or sound equipment on the transmitting side and the recording/playback equipment on the signal receiving side in synchronization with each other. This means that it is possible to actually transmit information such as video information from the signal transmitting side to the signal receiving side.

BRIEF DESCRIPTION OF THE DRAWINGS

FIG. 4 is a view showing a schedule command (VCR picture recording operation control);

FIG. 5 is a view showing the correlation between the mode code and the picture recording operation mode;

FIG. 6 is a view showing the schedule command (VCR playback operation control);

FIG. 13 is a view showing the structure of a second embodiment of this invention;

FIG. 14 is a flowchart showing the data setting up process on the uplink side of the example in FIG. 13;

FIG. 15 is a flowchart showing the operation of the uplink side of the example in FIG. 13;

FIG. 16 is a flowchart of the schedule command (setting of timing); and

DETAILED DESCRIPTION OF THE PREFERRED EMBODIMENTS

First Embodiment

The following is a description, with reference to the diagrams, of a first embodiment of this invention.

Figure 1:
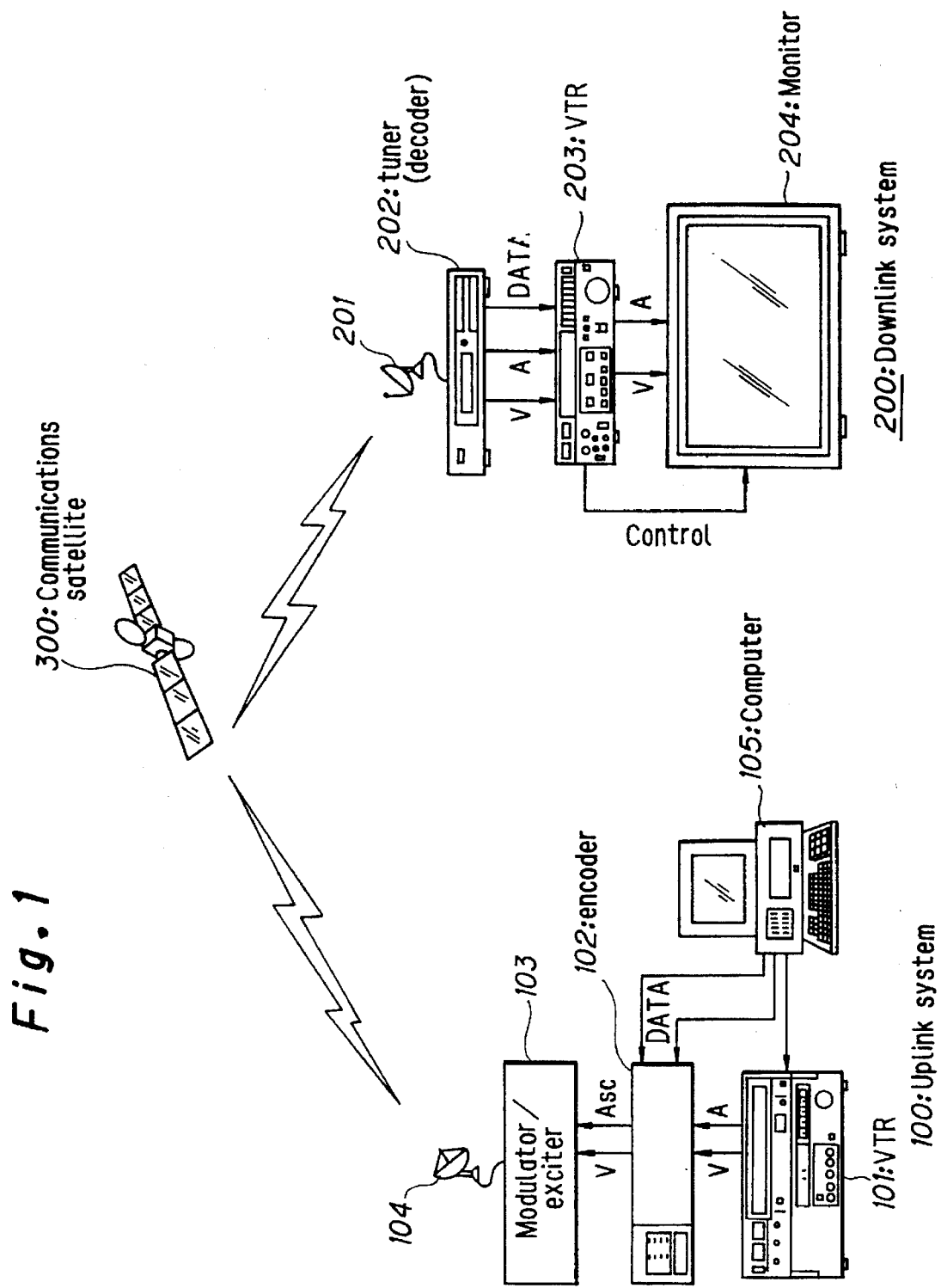
FIG. 1 is a view showing the structure of a recording/playback apparatus for a first embodiment of this invention.

FIG. 1 is a view of the structure of a first embodiment of this invention. In this diagram, numeral 100 indicates an uplink system (transmission side apparatus), numeral 200 indicates the downlink system (receiving side apparatus) and numeral 300 indicates the communications satellite.

First, a description of the uplink system 100 will be given. The uplink system 100 is made up of a VCR 101, an encoder 102, a modulator/exciter (output amplifier) 103, a transmission antenna 104 and a computer 105. The computer 105 controls the operation of the VCR 101 and the encoder 102.

The picture signal V and audio signal A which make up the playback output from the VCR 101 are provided to the encoder 102. Control data DATA for controlling the operation of the transmission side VCR from the computer 105 is also provided to the encoder 102. The digitally converted audio signal A is then multiplexed with the control data DATA at the encoder 102 and a scramble process is carried out using interleave and PN signals. The scrambled audio signal A (which includes the data DATA) is then made into a four phase DPSK modulated audio signal carrier Asc.

Scrambling is also carried out at the encoder 102 on the image signal V using processes such as line shuffling (line changeover). The scrambled picture signal V and the audio signal carrier Asc are outputted from the encoder 102 to the modulator/exciter 103. These are then put into composite form to be FM modulated and amplified before being sent to the communications satellite 300 via the transmission antenna 104.

Figure 2:
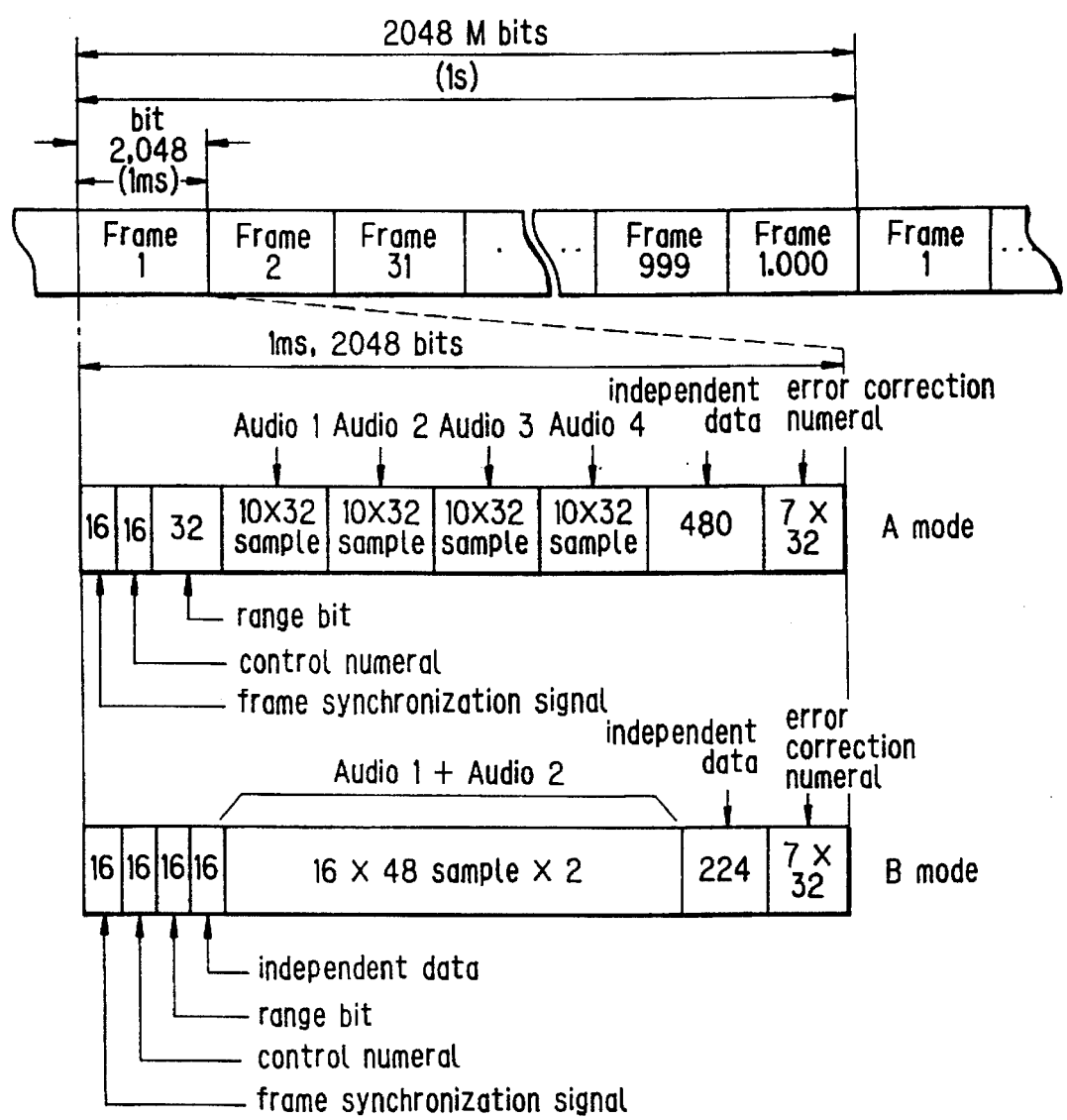
FIG. 2 is a view showing the structure of an audio signal transmitted via a communications satellite.

FIG. 2 is a view of the structure of the audio signal transmitted by the uplink system 100 via the transmission antenna 104. One frame of the audio signal is made up of a 2048 bit digital signal, with this signal being transmitted 1000 times a second. Within the frame structure, the first sixteen bits represent the frame synchronization signal and are included so as to make bit clock generation on the receiving side easier. The next sixteen bits represent a control mark which indicates the mode being transmitted at. These are for marking sections such as A and B mode sections, television sound and independent sound sections, or stereo and mono-aural sections.

In A mode, the next 32 bits represent the range bit and in B mode the next 16 bits represent the range bit. Each eight bits of these bits are allotted to a single channel of audio and represent the changeover information for the compression and expansion characteristics. When in B mode, as there are only two channels of audio, the range bit is only half of that for the A mode so that the bits corresponding to the third and fourth channels in the A mode can be used for independent data.

During A mode, the next four 10×32 samples are allotted to four channels of audio data and the 480 bit portion which follows it is then allotted to independent data. During B mode, the 16×48 sample×2 portion is allotted to two channels of audio data and the 224 bit portion which follows it is allotted to independent data. The final 7×32 bits of the frame structure represent the error correction numeral, and this is added to the audio and independent data numerals with the frame synchronization signal and control signal removed. The control data DATA provided by the computer 105 is multiplexed with the independent data.

Figure 3:
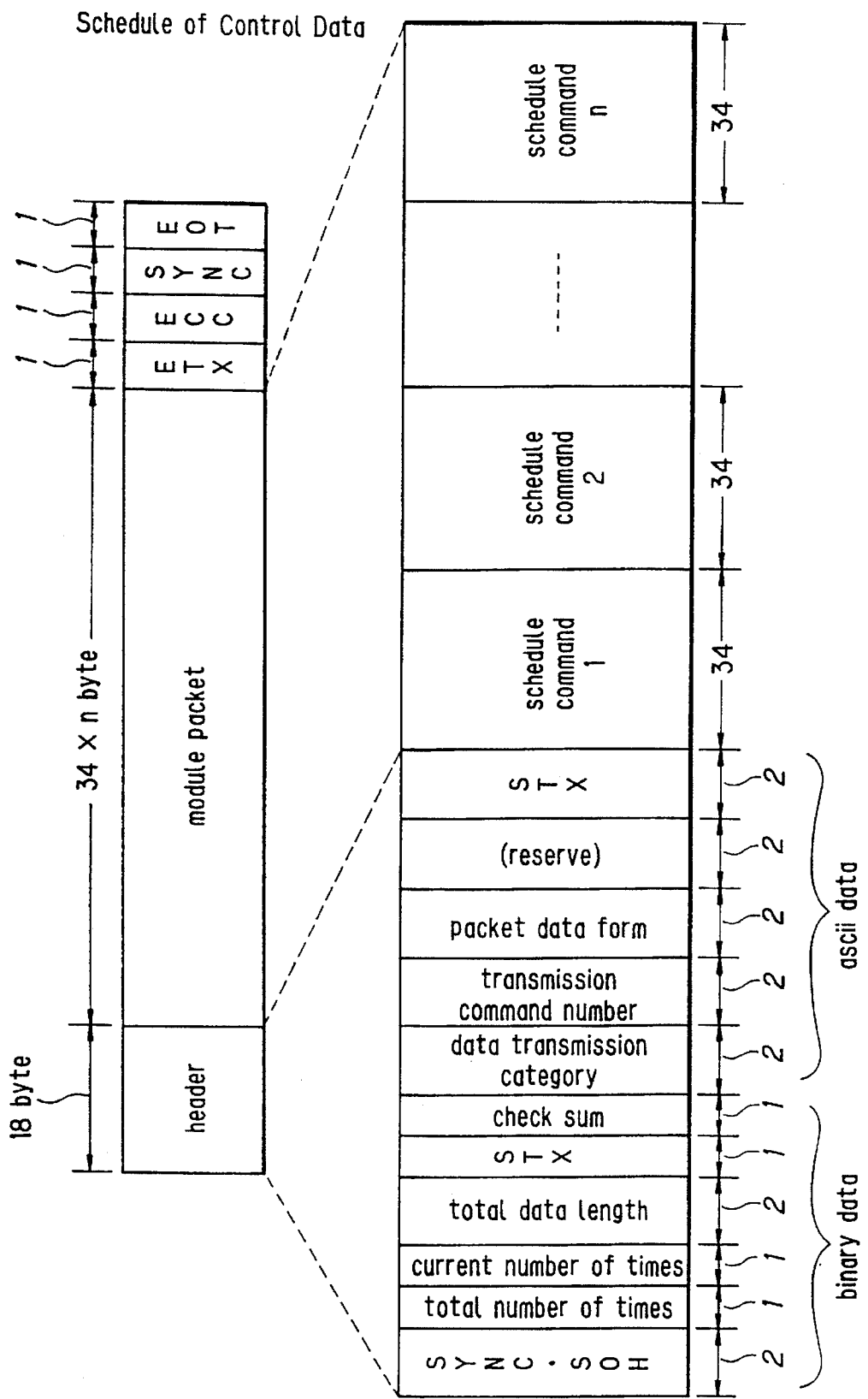
FIG. 3 is a view showing the structure of control data transmitted via a communications satellite.

FIG. 3 is a view of the structure of the control data DATA outputted by the computer 105. The first eighteen bytes are allotted to a header, and the bits which follow this are allotted to a module packet made up of n (34 byte) schedule commands. The next byte is allotted to an end of text signal ETX for signifying the end of the module packet. Then, the next byte is allotted to an error correction numeral ECC which is added to the module packet and end of text signal ETX. This is followed by a one byte synchronization signal SYNC and the final byte is allotted to and end of transmission signal EOT for indicating the end of the transmission data.

The first two bytes of the header are allotted to a synchronization signal SYNC and a start of header signal SOH (00H+01H). The next byte is allotted to total data for displaying the total number of consecutive transmissions for the same module packet. This is followed by a current data byte for displaying the number of consecutive transmissions from the total which have currently taken place, two bytes allotted to total data length data for displaying the number of bytes from the module packet to the end of transmission signal EOT for the next module packet [18] and a start of text signal STX (02H) byte for punctuating the data. Up until this point, the header data has been binary data, but from this point on the header data is made up of ASCII data. Here, the "H" attached to the numeral indicates Hexadecimal. This also applies to that below.

The first two bytes of this data are allotted to a data transfer category for machines which transfer data such as VCRs or computers. Next, two bytes are allotted to transfer command number data for indicating the number of schedule commands n for the module packets, then two bytes are allotted to data method data for indicating whether the data encoding method is a binary or ASCII method. Next, two bytes are allotted as reserve bits and finally, one byte is allotted to an STX signal for punctuating the data.

Next, a detailed description of the schedule command will be given.

FIG. 4 is a view of an example structure for a schedule command for controlling the picture recording operation of a VCR. The bytes are numbered from zero to 31. Bytes 0 and 1 are function codes, which are codes [0102H] for showing the recorded picture, bytes 2 to 8 are for data to show the start date, time and year, byte 9 is a reserve byte, bytes 10 to 13 are for data for showing the recording start position (timecode), bytes 14 to 17 are for data for showing the recording end position (timecode) and bytes 18 to 21 are for data for indicating the group to be controlled by the picture recording operation. In this case, each of groups 1 to 29 can be designated by flag bits 0 to 29, bit 30 is a reserve bit and bit 31 indicates all groups.

The 22nd and 23rd bytes are for codes for displaying the picture recording operation mode. FIG. 5 shows the relationship between the code and the picture recording operation mode. The code [01H] indicates the [REC] mode which is just for picture recording. Code [02H] indicates the [LIVE] mode for controlling the mute and the TV (monitor) when recording is not taking place. Code [03H] indicates the [REC/LIVE] mode which controls the picture recording, along with the mute and TV. Code [81H] indicates the [REC and recording check] for recording pictures and then finally carrying out a recording check, and code [83H] indicates a [REC/LIVE and recording check] mode which controls the picture recording, mute and TV, and finally carries out a recording check.

Returning to FIG. 4, the 24th and 25th bytes are for data for indicating the media. For example, bits 0 to 3 may be taken to be flags for designating VCRs 1 to 4. Byte 26 is for data for displaying the execution number, which can designate the numbers 1 to 255, with 0 indicating that there will be no execution. Byte 27 is a reserve byte, bytes 28 to 31 are for data for indicating the repeat interval for repeating picture recording operations, byte 32 is a check sum byte for bytes 0 to 31, and byte 33 is a reserve byte.

FIG. 6 is a view showing an example of the structure of a schedule command for controlling the playback operation of a VCR. The bytes are numbered from zero to 31. Bytes 0 and 1 are function codes, which are codes [0102H] for showing the recorded picture, bytes 2 to 8 are for data to show the start date, time and year, byte 9 is a reserve byte, bytes 10 to 13 are for data for showing the playback start position (timecode), bytes 14 to 17 are for data for showing the playback end position (timecode) and bytes 18 to 21 are for data for indicating the group to be controlled by the picture playback operation. In this case, each of groups 1 to 29 can be designated by flag bits 0 to 29, bit 30 is a reserve bit and bit 31 indicates all groups.

Figures 7, 8:
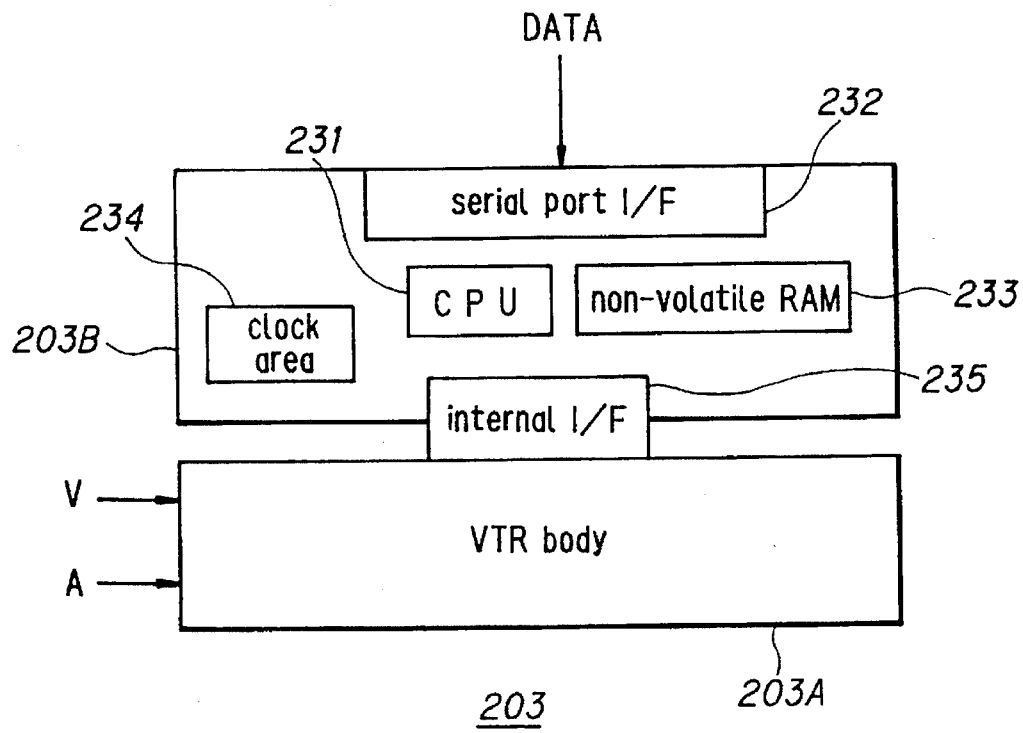
FIG. 7 is a view showing the correlation between the mode code and the playback operation mode.
FIG. 8 is an outline of the structure of a VCR.

The 22nd and 23rd bytes are for codes for displaying the picture recording operation mode. FIG. 7 shows the relationship between the code and the picture playback operation mode. The code [01H] indicates the [NORMAL] mode which is just for picture playback. Code [02H] indicates the [POWER ON] mode for controlling playback, along with the mute and the TV (monitor). Code [03H] indicates the [AUTO] mode which controls the picture playback, along with the mute and TV.

Returning to FIG. 6, the 24th and 25th bytes are for data for indicating the media. For example, bits 0 to 3 may be taken to be flags for designating VCRs 1 to 4. Byte 26 is for data for displaying the execution number, which can designate the numbers 1 to 255, with 0 indicating that there will be no execution. Byte 27 is a reserve byte, bytes 28 to 31 are for data for indicating the repeat interval for repeating picture playback operations, byte 32 is a check sum byte for bytes 0 to 31, and byte 33 is a reserve byte.

Next, the downlink system 200 in FIG. 1 will be described. The downlink system 200 is made up of a receiving antenna 201, a tuner (decoder) 202, a VCR 203 and a monitor (TV) 204.

As mentioned previously, the FM modulated picture signal V and audio signal carrier Asc transmitted to the communications satellite 300 by the transmission antenna 104 for the uplink system go from the communications satellite 300 to the tuner 202 via the receiving antenna 201. At the tuner 202, after FM de-modulation has been carried out, a decoding process which is the reverse of the aforementioned encoding process which took place at the encoder 102 in the uplink system is carried out. The picture signal V, audio signal A and control data (function signal) DATA from the tuner 202 are then provided to the VCR 203.

FIG. 8 is a view of an outline of the construction of a VCR 203. The VCR 203 is made up of a VCR body 203A and a control area 203B. The picture signal V and the audio signal A are sent to the VCR body 203A from the tuner 202. The control area 203B is made up of a control CPU 231, a serial port interface 232 for receiving control data DATA from the tuner 202, a non-volatile RAM 233, a clock area 234 for generating clock data and an internal interface 235 for communicating with the VCR body 203A.

The CPU 231 carries out the execution process based on the receiving process for the schedule command and the schedule data.

Figure 9:
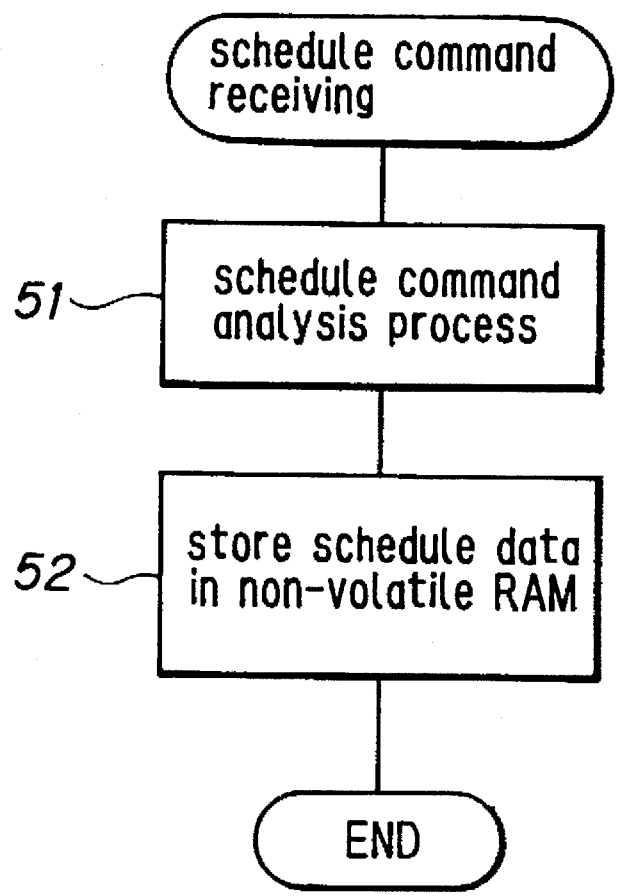
FIG. 9 is a flowchart showing the schedule command receiving process.

FIG. 9 is a flowchart showing the receiving process for the schedule command. The control data DATA is first received at the interface 232. Then, in step 51, it is determined whether the number of module packets of consecutively received control data DATA is the same as the prescribed number. If they are the same, then the control data DATA is confirmed as being valid. It is then determined if the group and media for each of the n schedule commands included in the module packet for this control data DATA are self designating. If this is so, in step 52, the necessary data within the schedule command is taken as the schedule data and is stored in the non-volatile RAM 233.

For example, in the aforementioned case of a schedule command for controlling the picture recording operation of a VCR, the function code, start date, time and year data, recording start position data, recording end position data, mode data, execution data and repeat interval data are stored in the non-volatile RAM 233. In the same way, in the case of the schedule command (see FIG. 6) for controlling the playback operation of the VCR, the function code, start date, time and year data, playback start position data, playback end position data, mode data, execution number data and repeat interval data are written into in the non-volatile RAM 233.

Figure 10:
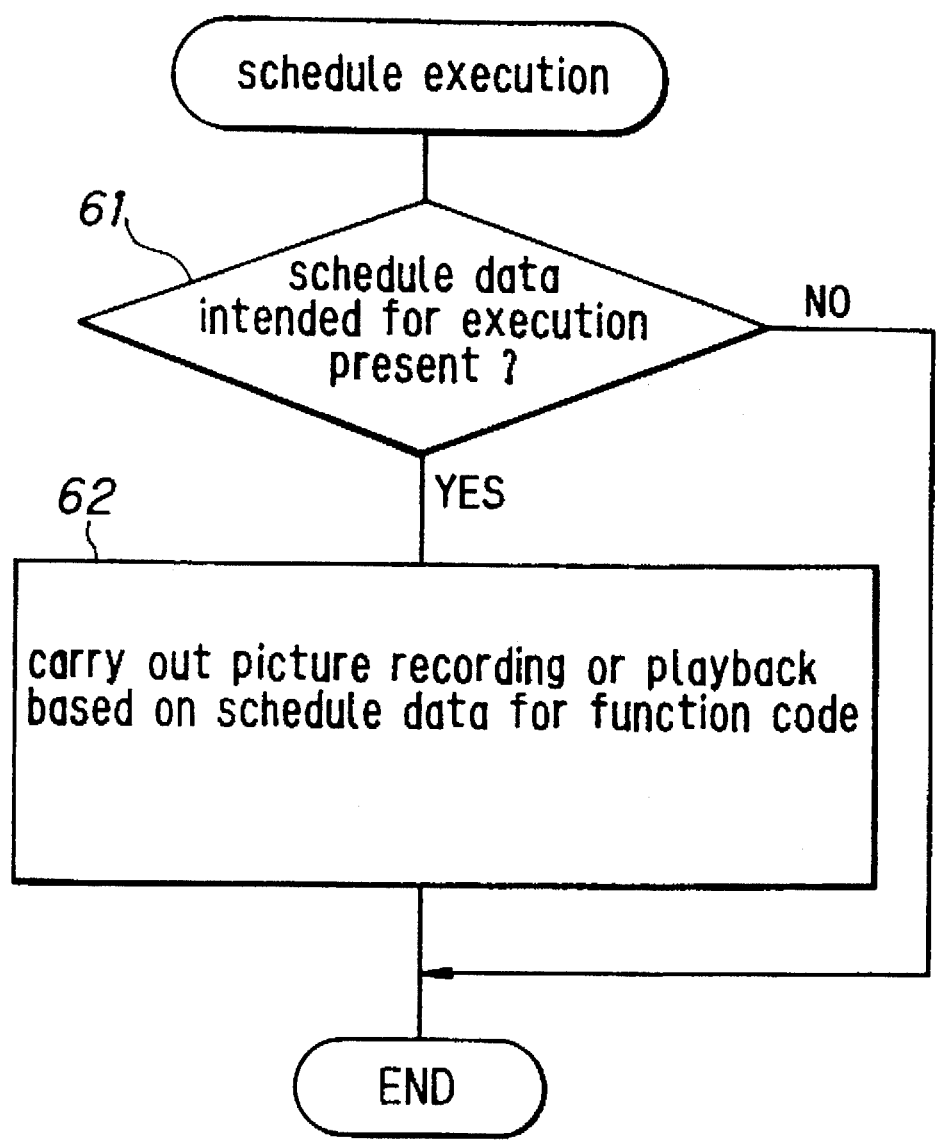
FIG. 10 is a flowchart showing the schedule execution process.

FIG. 10 is a flowchart of the execution process based on the schedule data. This execution process is carried out as an interrupt process scheduled to take place, for example, every one second.

In step 61 it is determined whether the schedule data it is intended to execute is present in the non-volatile RAM 233. In this case, it is determined whether the schedule data it is intended to execute is schedule data which has a start date, time and year which is within the time (year, month, day, hours, minutes, seconds) prescribed by the time data generated by the clock area 234. [0034]

When it is not the schedule data which it is intended to execute, this determination is carried out again on the next interrupt process. On the other hand, when it is the schedule data it is intended to execute, control data is sent from the CPU 231 in the control area 203B to the VCR body 203A via the interface 235 based on this schedule data, and the picture recording or playback indicated by this function code is carried out (step 62).

Figure 11:
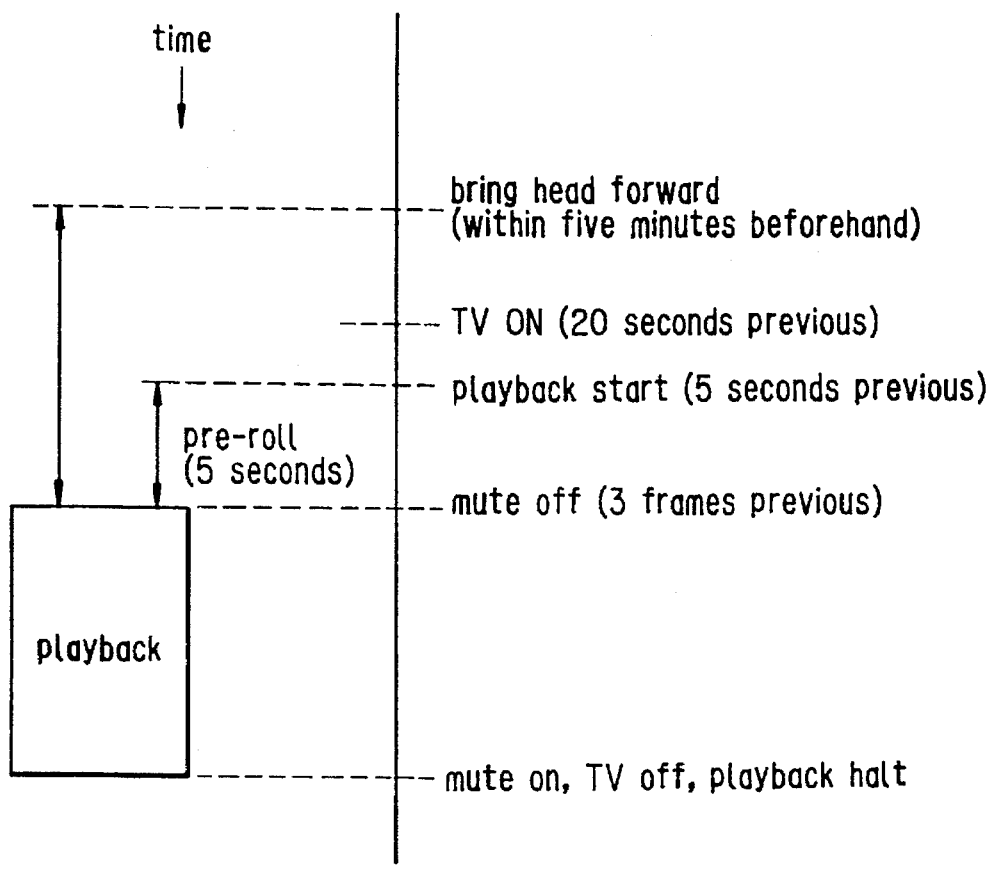
FIG. 11 is view showing the playback operation flow.

FIG. 11 is a flowchart describing the playback operation (power on mode).

First, within five minutes of the start day/time/year, the tape is moved to the pre-roll position which precedes the playback start position by five seconds by referring to the timecode. Then, 20 seconds before the start time, the monitor (TV) is switched on. The VCR playback then starts 5 seconds before the start of actual playback, and the mute is turned off three seconds previous to playback. The picture signal V and audio signal A are then sent to the monitor 204 and playback commences. When it is then determined using the timecode that the end of playback position has been reached, the mute is turned on, the power supply for the monitor 204 is turned off, the playback of the VCR 203 is halted and the playback operation is completed. The flowchart for the recording operation is the same as this, although this has been omitted from the diagrams.

In this kind of embodiment, a schedule command has already been sent from the uplink system 100 to the downlink system 200 via the communications satellite. Schedule data is therefore stored in the non-volatile RAM 233 in the control area 203B of the VCR 203 within the downside system. This means that control data can be sent from the CPU 231 to the VCR body 203A based on the clock data generated by the clock area 234 for the control area 203B and the schedule data stored in the RAM 233. The recording or playback operations and their related operations can then be carried out at the VCR body 203A automatically.

As a result of this, as there are no appropriate commands sent in real time from the control side as there were in the related art, the planned execution of the complex operations which accompany operations such as rewind, initialization and pre-roll can be easily carried out.

Figure 12:
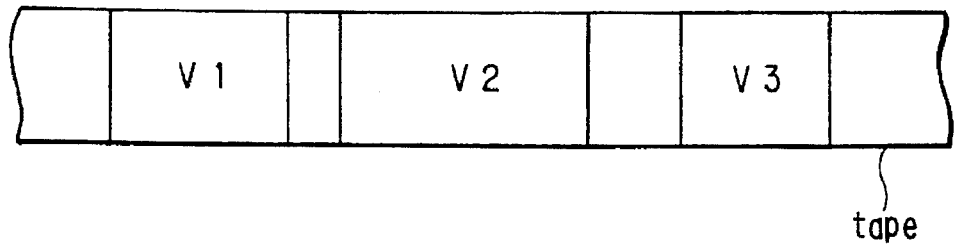
FIG. 12 is a view showing tape segmentation.

In this way, as is shown in FIG. 12, a number of items of video information can be recorded on a single tape at dates and times whose position is indicated by the timecode. Operations such as the playback of these items of video information at the indicated date and time can then be automatically carried out. This dramatically reduces the burden placed upon the control side.

Second Embodiment

The following is a description, with reference to FIG. 13, of a second embodiment of this invention. In FIG. 13, portions which correspond to portions in FIG. 1 have been given the same numerals and their detailed description will be omitted.

In this embodiment, the uplink system is made up of VCRs 101-1 and 101-m, an encoder 102, a modulator/exciter 103, a transmission antenna 104, a computer 105, a video camera 106, still image recording/playback equipment 107 and a switcher 108. The operation of the VCRs 101-1 and 101-m, the encoder 102, the video camera 106, the still image recording/playback equipment 107 and the switcher 108 is controlled by the computer 105.

The respective video signals V and audio signals A outputted from the VCRs 101-1 and 101-m and the camera 106, and the picture signal V outputted from the still image recording/playback apparatus 107 are sent to the switcher 108. The picture signal V and audio signal A outputted from the switcher 108 are then sent to the encoder 102.

The operation of the encoder 102 is the same as for the example shown in FIG. 1. The scrambled picture signal V and the audio signal carrier Asc are outputted from the encoder 102 to the modulator/exciter 103. These are then put into composite form to be FM modulated and amplified before being sent to the communications satellite 300 via the transmission antenna 104.

In this embodiment, the control data DATA for controlling the operation of the receiving side VCR provided to the encoder 102 by the computer 105 and data such as the data for making up the control data for controlling the operation of VCR 101-1 and VCR 101-m, the encoder 102, the video camera 106, the still image recording/playback equipment 107 and the switcher 108 are pre-registered at the computer 105 using a keyboard and a mouse.

Large amounts of schedule data and management data are handled by the computer 105. The schedule consists of (1) the transponder (satellite circuit) schedule, (2) the programming schedule and (3) the playback schedule.

The transponder schedule data consists of data indicating the time, approximate duration, and satellite channel circuit used by the transmission. The setting up of the time, duration, circuit channel etc. is then carried out. Video information such as how long it takes to transmit from the uplink system 100 to the downlink system 200 is transmitted.

The programming schedule data consists of data indicating at what time which program will be broadcast to where. Settings such as transmission date and time, transmission mode(REC, LIVE etc.) and media etc. are carried out. The playback schedule data consists of what time which program will be played back, and in what way. Settings are carried out for the playback date and time, playback mode (TV monitor control etc.), number of repeat times, groups related to scramble authorization control etc.

The management data only is set up on the side of the downlink system 200 using expansion or structural modification. [0049] In this way, group set up and monitor control etc. can be carried out.

FIG. 14 is a flowchart of the data set-up operation for the computer 105.

In step 71 the transponder schedule is registered, in step 72 the program schedule is registered and in step 73 the playback schedule is registered.

FIG. 15 is a flowchart of the operation of the control process for the uplink system 100 which uses the computer 105. This control processing is carried out in interrupt processes executed at intervals of, for example, one second.

In step 81 it is determined whether or not the schedule it is intended to execute is present or not. If the schedule it is intended to execute is present, the database for the schedule data within the computer 105 is locked without modification in step 83 and control data is then made from the schedule data in step 84.

In step 85, the authorization for the encoder 102 is controlled and all of the downlink system is selected. In step 86, the timing data is sent to the downside and the timing on the downside is set. In FIG. 16, the structure of the schedule command which shows the timing settings is shown. The authorization data is transmitted as part of the audio signal carrier Asc.

In step 87 the authorization for the encoder 102 is controlled and in step 88 the schedule data is transmitted to the downlink. In step 89, the control of the equipment for the uplink side VCRs 101-1 and 101-m is carried out and in step 90 the downlink side video information is transmitted. Then, in step 91, the operation results are written into the hard disc of the computer 105 for checking.

Next, in step 92, it is determined whether or not the program it is intended to transmit is present. If it is present, step 85 of the process is returned to and the same operation is carried out again. On the other hand, if the program it is intended to transmit is not present, the database lock is removed in step 93, the encoder authorization is controlled in step 94, all of the items in the downlink are de-selected and the process is ended.

As the operation of the downlink system 200 side is the same as for the example in FIG. 1, it's description is limited.

In this embodiment, control data DATA for controlling the operation of the downlink system 200 side VCR 203 is outputted by the computer 105 on the side of the uplink system 100. This computer 105 also outputs control data for controlling items such as VCRs 101-1 and 101-m. the encoder 102 and the switcher 108. In this way, control can be focused on the downlink system 200 from the uplink system 100. As a result of this, the operation of the uplink system 100 and the downlink system 200 can be synchronized so that, for example, information such as video information can be accurately transmitted from the uplink side to the downlink side.

Third Embodiment

Figure 17:
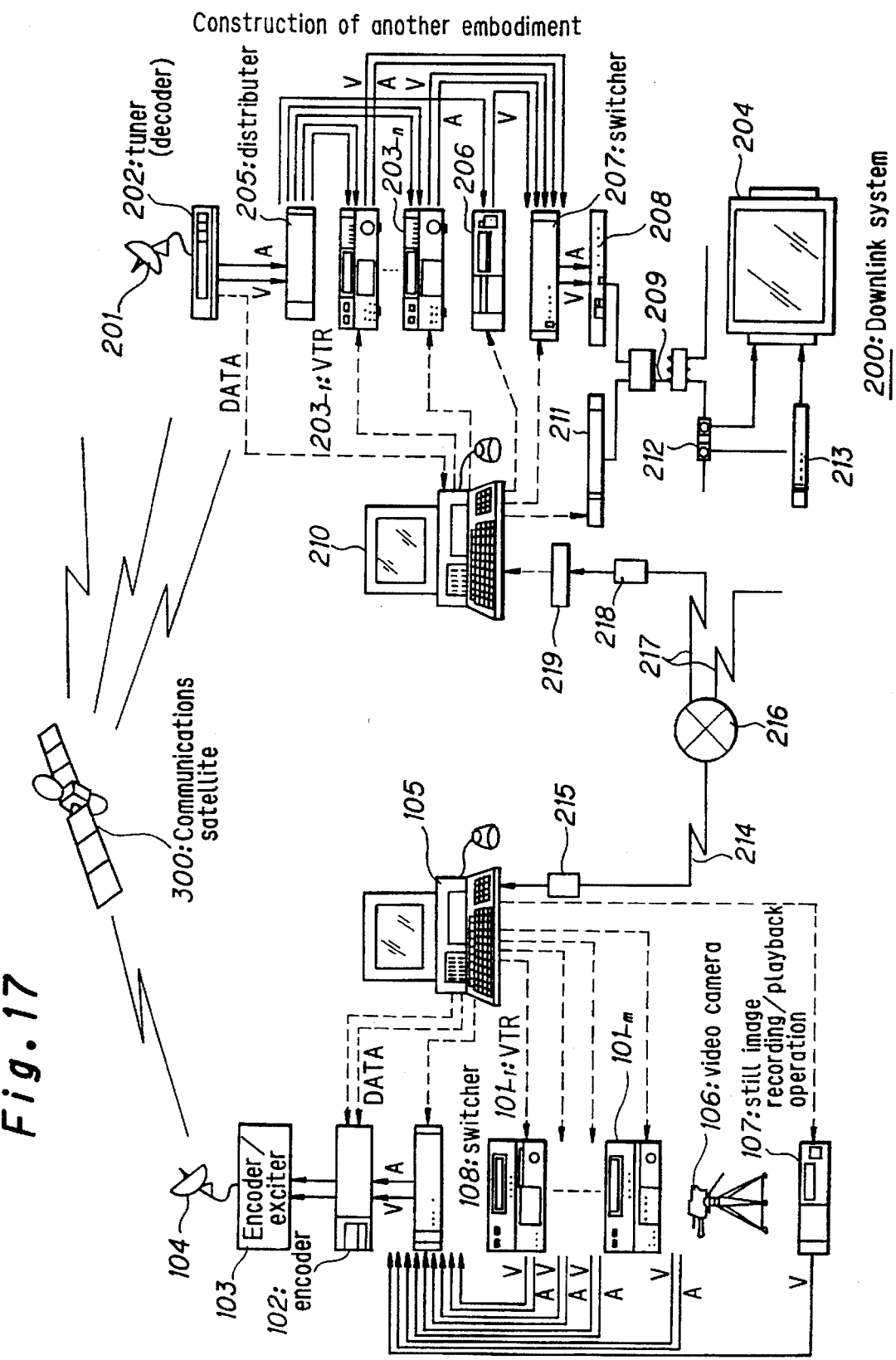
FIG. 17 is a view of the structure of a third embodiment of this invention.

Next, a description will be given, with reference to FIG. 17, of a third embodiment of this invention. In this embodiment, a number of items such as recording/playback equipment and switchers are set up on the in the downlink system 200. In FIG. 17, portions which correspond to portions in FIG. 13 have been given the same numerals and their detailed description has been omitted.

In this embodiment, the downlink system 200 is made up of a receiving antenna 201, a tuner (decoder) 202, VCRs 203-1 and 203-n, a monitor 204, a distributor 205, still image recording/playback equipment 206, a switcher 207, an RF modulator 208, a cable 209, a computer 210, an RF data modulator 211, a wall outlet 212 and a control box 213.

The picture signal V and audio signal A outputted by the tuner 202 are sent to the distributor 205. The distributor 205 then provides the respective picture signals V and audio signals A to the VCRs 203-1 and 203n, and provides a picture signal V to the still image recording/playback equipment 206. The picture signals V and audio signals A outputted from the VCRs 203-1 and 203-n and the video signal V outputted from the still image recording/playback equipment 206 are then sent to the switcher 207.

The control data DATA outputted from the tuner 202 is sent to the computer 210. Then, as with the example described in FIG. 1, various schedule data is produced from the control data for storing in places such as the hard disc. The computer 210 then controls the operation of the VCRs 203-1 and 203-n, the still image recording/playback apparatus 206 and switcher 207 using this schedule data.

The picture signal V and audio signal A outputted from the switcher 207 are sent to the RF modulator 208, turned into a television signal, and then sent to the monitor 204 via the cable 209 and the outlet 212. Also, the operation control signal for the monitor 204 outputted by the computer 210 is modulated by the RF data modulator 211 before being sent to the control box 213 via the cable 209 and the outlet 212. This is then de-modulated at the control box 213 before being sent to the monitor 204.

Also, the structure of the uplink system 100 is the same as that for the example shown in FIG. 13.

Further, in this embodiment, there is a land based circuit between the computer 105 for the uplink system 100 and the computer 210 for the downlink system 200. In this example, this uses a telephone circuit (digital circuit) with a DDX circuit 214, a first digital service unit 215, a digital exchange 216, an ISDN circuit 217, a second digital service unit 218 and a terminal adapter 219.

By using this kind of land-based circuit, the downlink side operation log can be transferred to and collected by the uplink side so that the system can operate effectively even in abnormal weather conditions.

Now, in the above embodiment, the schedule command included start date/time/year data, recording (playback) start position data and recording (playback) end position data. However, even if data other than this data is used, the recording/playback equipment in the downlink system may still be operated in the same way.

Also, rather than having the picture signal V and the audio signal A sent from the uplink system 100 down to the downlink system 200 side via the communications satellite 300, other picture signals V and audio signals A could be provided from a signal source within the downlink system 200.

What is claimed is:

1. Apparatus for controlling recording/playback equipment, comprising:

data outputting means for outputting control data for controlling the operating mode of selected ones of a plurality of recording/playback devices, said control data including operation data pertaining to a recording operation or a playback operation of selected recording/ playback devices, time data indicating at least a start time of the recording and/or playback operation, and position data indicating a position on a recording medium at which the recording and/or playback operation is to take place;

data transmitting means for transmitting said control data outputted from said data outputting means;

data receiving means for receiving said control data transmitted by said data transmitting means;

storage means for storing said control data received by said data receiving means in said selected recording/ playback devices as indicated in said control data; and control means for controlling the operations of the selected recording/playback devices in accordance with said control data stored in said storage means.

2. The apparatus of claim 1, wherein said control means is operable to select one of said plurality of recording/ playback devices in accordance with said control data stored in said storage means to control the operation of the selected device.

3. The apparatus of claim 2, wherein said control means is further operable to control the selected recording/playback device to perform a playback operation or a recording operation in accordance with said control data.

4. The apparatus of claim 3, wherein the selected recording/playback device is controlled to perform said playback operation or said recording operation at a time determined by said control data.

5. The apparatus of claim 1, wherein each said control means of said selected recording/playback devices is controlled automatically by the control data stored in said storage means of each device.

6. Apparatus for controlling recording/playback equipment, comprising:

data outputting means for outputting first control data for controlling operating modes of selected ones of a plurality of recording/playback devices which receive a signal, and second control data for controlling the operation of audio and/or visual equipment which transmit a signal, said first control data including operation data pertaining to a recording operation and/or a playback operation of selected recording/playback devices, time data indicating at least a start time of the recording and/or playback operation, and position data indicating a position on a recording medium at which the recording and/or playback operation is to take place;

transmitting means for transmitting said first control data outputted by said data outputting means and for transmitting a picture signal and/or audio signal supplied by said audio and/or visual equipment in accordance with said second control data;

receiving means for receiving said first control data and said picture signal and/or said audio signal transmitted by said transmitting means;

storage means for storing said first control data received by said receiving means in said selected recording/ playback devices as indicated in said first control data; and control means for controlling the operations of said selected recording/playback devices in accordance with said first control data stored in said storage means.

7. The apparatus of claim 6, further comprising means for registering contents of said first and second control data and for controlling an output timing of said first and second control data from said data outputting means.

8. The apparatus of claim 6, wherein said transmitting means is operable to transmit said first control data and said picture signal and/or audio signal via a satellite circuit or a ground based circuit.

9. The apparatus of claim 6, wherein each said control means of said selected recording/playback devices is controlled automatically by the first control data stored in said storage means of each device.

* * * * *